United States Patent
Schneider et al.

(10) Patent No.: US 10,324,441 B2
(45) Date of Patent: Jun. 18, 2019

(54) AUTOMATION SYSTEM AND METHOD FOR OPERATION OF THE AUTOMATION SYSTEM

(71) Applicant: SIEMENS AKTIENGESELLSCHAFT, Munich (DE)

(72) Inventors: Dirk Schneider, Lichtentanne (DE); Tobias Weber, Limbach-Oberfrohna (DE); Claudia Zschoppe, Chemnitz (DE)

(73) Assignee: Siemens Aktiengesellschaft, Munich (DE)

(*) Notice: Subject to any disclaimer, the term of this patent is extended or adjusted under 35 U.S.C. 154(b) by 166 days.

(21) Appl. No.: 15/636,812

(22) Filed: Jun. 29, 2017

(65) Prior Publication Data

US 2018/0011469 A1    Jan. 11, 2018

(30) Foreign Application Priority Data

Jul. 5, 2016    (EP) .................................... 16177889

(51) Int. Cl.
*G05B 19/05* (2006.01)
*G05B 19/042* (2006.01)
*G06F 13/40* (2006.01)

(52) U.S. Cl.
CPC ....... *G05B 19/056* (2013.01); *G05B 19/0423* (2013.01); *G05B 19/0426* (2013.01);
(Continued)

(58) Field of Classification Search
None
See application file for complete search history.

(56) References Cited

U.S. PATENT DOCUMENTS 4,539,655 A * 9/1985 Trussell ............... G05B 19/052
340/2.9
6,088,624 A * 7/2000 Khan ................. G05B 19/0423
700/19

(Continued)

OTHER PUBLICATIONS

'Designing Communication Techniques for PLC in Automation with Considering Cleaning Machine' from Proceedings of the IEEE 2017 International Conference on Computing Methodologies and Communication, copyright 2017, IEEE. (Year: 2017).*

(Continued)

*Primary Examiner* — Steven G Snyder
(74) *Attorney, Agent, or Firm* — Cozen O'Connor

(57) ABSTRACT

An automation system includes a first control facility with a first fieldbus connection, a second control facility with a second fieldbus connection, a fieldbus, a peripheral board with at least one I/O peripheral module, wherein the peripheral board has an interface module with a third fieldbus connection, where the interface module has at least one I/O module which stores interconnection information featuring an assignment of input/outputs of the I/O peripheral module(s) to the control facilities, where the interface module additionally has a virtual I/O module, in which an output region is assigned to the first control facility, and furthermore an input region is assigned to the second controller, and where the virtual I/O module is configured such that the output data is copied from the output region of the first control facility into the input region as input data for the second control facility.

3 Claims, 2 Drawing Sheets

(52) U.S. Cl.
CPC ....... *G05B 19/052* (2013.01); *G06F 13/4063* (2013.01); *G05B 2219/1134* (2013.01); *G06F 2213/0058* (2013.01)

(56) References Cited

U.S. PATENT DOCUMENTS

| | | | | |
|---|---|---|---|---|
| 6,587,900 | B1* | 7/2003 | Wischinski | G05B 19/042 710/68 |
| 7,151,966 | B1* | 12/2006 | Baier | G05B 19/056 700/19 |
| 7,512,906 | B1* | 3/2009 | Baier | G06F 9/451 715/866 |
| 7,596,635 | B2* | 9/2009 | Siorek | G05B 19/0425 710/15 |
| 7,643,891 | B2* | 1/2010 | Rule | G05B 19/042 700/19 |
| 7,860,589 | B2* | 12/2010 | Bliss | G05B 19/056 700/19 |
| 7,987,305 | B2* | 7/2011 | Blair | G05B 19/054 370/395.43 |
| 8,499,277 | B2* | 7/2013 | Tone | G05B 19/052 717/100 |
| 9,405,644 | B2* | 8/2016 | Grosch | G05B 19/058 |
| 10,037,443 | B2* | 7/2018 | Maturana | G05B 17/02 |
| 2002/0194328 | A1* | 12/2002 | Hallenbeck | G04G 13/021 709/224 |
| 2006/0190094 | A1* | 8/2006 | Gehlen | H01R 31/005 700/1 |
| 2007/0076264 | A1* | 4/2007 | Pierce | G05B 19/054 358/474 |
| 2007/0208440 | A1* | 9/2007 | Bliss | G05B 19/056 700/87 |
| 2008/0140888 | A1* | 6/2008 | Blair | G05B 19/054 710/104 |
| 2009/0265020 | A1* | 10/2009 | Blair | G05B 19/054 700/19 |
| 2009/0276059 | A1 | 11/2009 | Tone et al. | |
| 2012/0331104 | A1* | 12/2012 | Akiyama | H04L 63/1408 709/217 |
| 2013/0274900 | A1 | 10/2013 | Uhde et al. | |
| 2014/0380177 | A1* | 12/2014 | Gutermuth | G05B 19/0423 715/736 |
| 2015/0019191 | A1* | 1/2015 | Maturana | G05B 17/02 703/13 |
| 2015/0095690 | A1* | 4/2015 | Grosch | G05B 19/058 714/4.11 |
| 2017/0344675 | A1* | 11/2017 | Lutz | G05B 17/02 |

OTHER PUBLICATIONS

Mirko Funke: "PROFINET Innovations 2010", Dec. 31, 2010 (Dec. 31, 2010), pp. 1-8, XP002688117, Nuremberg, Germany.
European Search Report dated Dec. 7, 2016 issued in corresponding European Application No. 16177889.

* cited by examiner

AUTOMATION SYSTEM AND METHOD FOR OPERATION OF THE AUTOMATION SYSTEM

BACKGROUND OF THE INVENTION

1. Field of the Invention

The invention relates to an automation system comprising a first control facility with a first fieldbus connection, a second control facility with a second fieldbus connection, a fieldbus, a peripheral board with at least one I/O peripheral module for the connection of sensors and/or actuators, where the peripheral board has an interface module with a third fieldbus connection for communication to or from the control facilities, where the interface module has at least one I/O module which stores interconnection information which features an assignment of input/outputs of the I/O peripheral module(s) to the control facilities.

2. Description of the Related Art

An automation system or a fieldbus system in which a cyclical exchange of input and output data occurs between a plurality of communication partners, typically programmable logic controllers and peripheral systems is known.

A direct cyclical data exchange between a plurality of programmable logic controllers (PLCs), which is necessary, for example, for coupling of machines in a production line, is not supported by systems of this kind, as communication relationships are only established between the programmable logic controllers and the peripheral systems.

SUMMARY OF THE INVENTION

In view of the foregoing, it is an object of the invention to provide a simple, flexible and powerful fieldbus communications between a plurality of programmable logic controllers.

This and other objects are achieved in accordance with the invention by an automation system cited in which the interface module additionally has a virtual I/O module, in which an output region, in which the first control facility can write output data, is assigned to the first control facility, and furthermore an input region, from which the second control facility can retrieve input data, is assigned to the second control facility. In this case, the virtual I/O module is configured such that the output data is copied from the output region of the first control facility into the input region as input data for the second control facility.

It should be understood the interface module can also contain a plurality of additional virtual I/O modules.

The I/O modules can be envisioned as a configurable storage area in which, during the connection to a control facility, configuration data corresponding to the interface module is transmitted. Accordingly, the interface module has two types of I/O modules in accordance with the invention, namely the real I/O modules for the actual peripherals and the virtual I/O modules for the intercommunication of the control facilities.

It is also an object of the invention to provide a method for the operation of an automation system. In the method for operation of an automation system, a first control facility and a second control facility exchange data with a peripheral board via a fieldbus, where the data exchange relates, on the one hand, to transmitting output data to the peripheral module, where the output data is delivered to an I/O peripheral module via an I/O module in an interface module of the peripheral board, and on the other hand the exchange data relates to reception of input data by the peripheral module, where the input data is accepted by the I/O peripheral module via the I/O module in the interface module of the peripheral board.

In accordance with the invention, a virtual I/O module is operated in the interface module, in which an output region, in which the first control facility can write output data, is assigned to the first control facility, and furthermore an input region, from which the second controller can retrieve input data, is assigned to the second controller. Here, in the virtual I/O module the output data is copied from the output region of the first control facility into the input region as input data for the second control facility.

In an advantageous embodiment of the method, a first channel is formed for the first control facility by the assignment of the output region to the first control facility and a second channel is formed for the second control facility by the assignment of the input region to the second controller, where the first control facility communicates with the second control facility via the peripheral module using a data transmission link that features the first channel and the second channel.

By making use of concurrent accesses to I/O channels of the peripheral module, such as is performed and implemented in Profinet Shared Device, for example, and by using the virtual I/O module in the peripheral board or the peripheral module, a direct communication from one control facility to another control facility (inter-PLC communication) is realized. Here, output data of a control facility with write access in the virtual I/O module of the peripheral board is assigned to the input data of a further control facility or even a plurality of further control facilities. This means that the data of one output channel can be transmitted to the input channels of other controllers. An assignment and a data width of the I/O channels can be performed in a fixed (static) or flexible (dynamic) manner. From the perspective of a control facility accessing data, a point-to-point communication between two fieldbus participants is always involved. The controller applications are responsible for usage and allocation of the communication channels made available by the virtual I/O module. For example, the mirroring of real peripheral data and the transmission of parameter and status information of one controller application to another controller facility is enabled.

An implementation of the method could also be effected as a software solution in the interface module of the peripheral board and would have the advantage that no additional fieldbus boards, such as Profinet-Profinet couplers, and no additional wiring for a PLC-PLC communication are required. This is considered to be advantageous in terms of cost, if the control facilities used support neither a controller-to-controller (C2C) nor an I/O controller multicast (CC-DX) communication. The communication between the control facilities is effected via established fieldbus communication mechanisms and places no new requirements on the pre-existing technology and the components to be accessed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing describes an exemplary embodiment of the invention, in which.

DETAILED DESCRIPTION OF THE EXEMPLARY EMBODIMENTS

Figure 1:
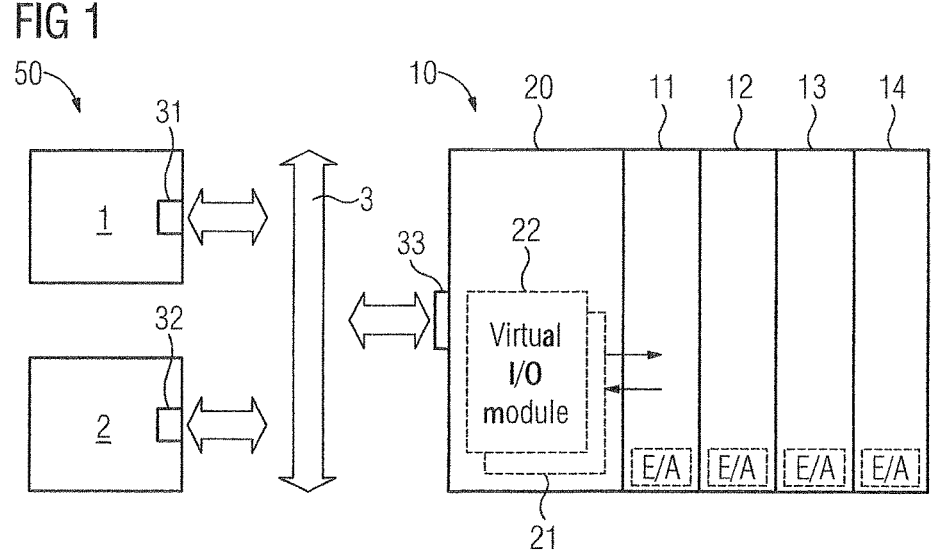
FIG. 1 shows an automation system in accordance with the invention.

FIG. 1 shows automation system 50 with a first control facility 1 and a second control facility 2. The first control facility 1 is connected to a fieldbus 3 via a first fieldbus connection 31. The second control facility 2 is connected to the fieldbus 3 via a second fieldbus connection 32. A peripheral board 10 is connected to the fieldbus 3 via a third fieldbus connection 33. The peripheral board 10 has an interface module 20, with a first I/O peripheral module 11, a second I/O peripheral module 12, a third I/O peripheral module 13 and a fourth I/O peripheral module 14 in a row thereon. The I/O peripheral modules 11,12,13,14 are connected to the interface module 20 via a backplane bus. With the internal backplane bus, the I/O peripheral modules 11,12,13,14 can exchange data, in particular input data from sensors or output data to actuators.

In the interface module 20, there is provision for at least one I/O module 21 in which interconnection information is stored, where the interconnection information features an allocation of inputs/outputs of the I/O peripheral module(s) 11,12,13,14 to the control facilities 1,2.

In order to now enable a direct communication from the first control facility 1 to the second control facility 2, the interface module 20 has a virtual I/O module 22, in which an output region 40 (see FIG. 2), in which the first control facility 1 can write output data, is assigned to the first control facility, and furthermore an input region 42 (see FIG. 2), from which the second control facility 2 can retrieve input data, is assigned to the second control facility 2. Here, the virtual I/O module 22 is configured such that the output data is copied from the output region 40 of the first control facility 1 into the input region 42 as input data for the second control facility 2.

Figure 2:
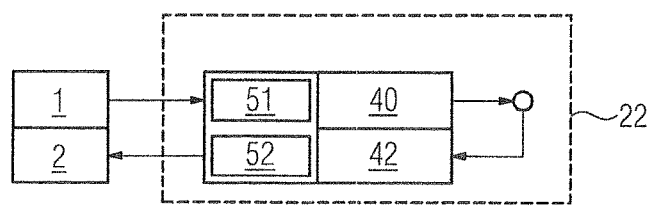
FIG. 2 shows a virtual I/O module for access by two control facilities in accordance with the invention.

With reference to FIG. 2, the virtual I/O module 22 is shown in one embodiment for communications between the first control facility 1 and the second control facility 2. By assigning the output region to the first control facility 1, a first channel 51 is formed for the first control facility 1. By assigning the input region 42 to the second control facility 2, a second channel 52 is formed for the second control facility 2. Here, the first control facility 1 can directly communicate with the second control facility 2 via the peripheral module 20 using a data transmission link that features the first channel 51 and the second channel 52.

Figure 3:
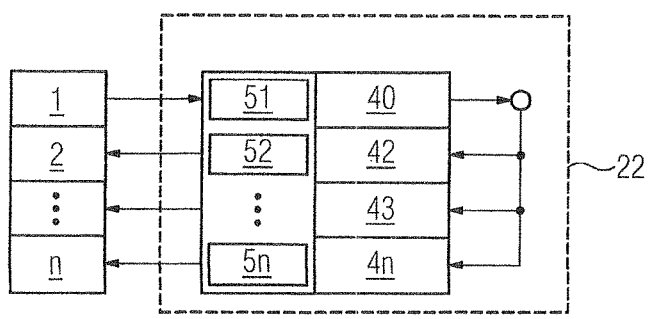
FIG. 3 shows the virtual I/O module for access by n-controllers in accordance with the invention.

As shown in FIG. 3, a communication for n-control facilities is also possible. In accordance with the example shown in FIG. 3., the first control facility 1 makes output data available in the output region 40 via the first channel 51. The output data of the output region 40 is copied into the input region 42 and moreover into a second input region 43, . . . , nth input region 4n. Here, the input region 42 is assigned to the second control facility 2 via the second channel 52 and the nth input region 4n is assigned to an nth control facility n via an nth channel. The first control facility 1 can thus serve as a transmitter for data and the rest of the control facilities 2, . . . , n can serve as transmitters of the data via the corresponding channels 52, . . . , 5n for the data.

Figure 4:
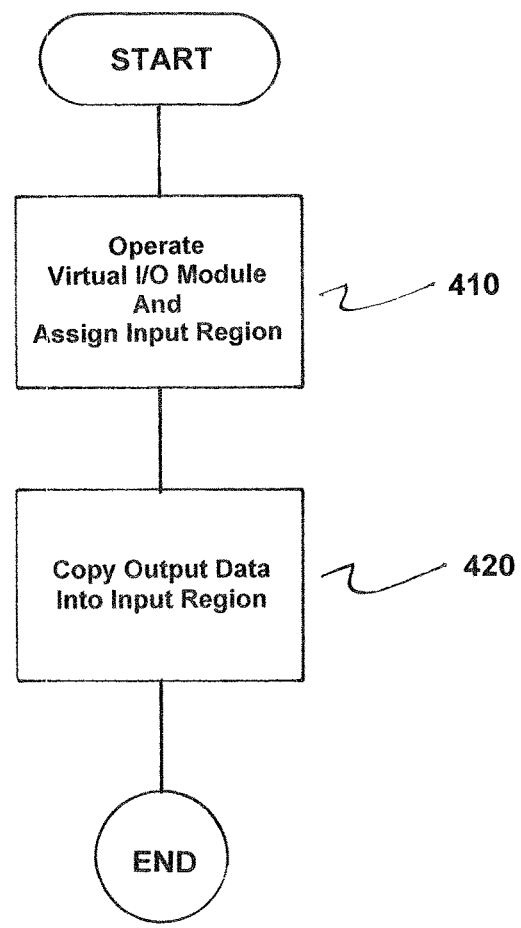
FIG. 4 is a flowchart of the method in accordance with the invention.

FIG. 4 is a flowchart of a method for operating an automation system 50, where a first control facility 1 and a second control facility 2 exchange data with a peripheral board 10 via a fieldbus 3, the data exchange relates to the transmittal of output data to the peripheral module 20, the output data is delivered to an input/output (I/O) peripheral module 11 via an I/O module 21 in an interface module 20 of the peripheral board 10, and the data exchange relating to the reception of input data by the peripheral module 20, and where the input data is accepted by the I/O peripheral module 11 via the I/O module 21 in the interface module 20 of the peripheral board 10.

The method comprises operating a virtual I/O module 22 in the interface module 20, in which an output region 40, in which the first control facility 1 can write output data, is assigned to the first control facility 1, and furthermore an input region 42, from which the second controller 2 can retrieve input data, is assigned to the second control facility 2, as indicated in step 410.

Next, within the virtual I/O module 22, the output data from the output region 40 of the first control facility 1 is into the input region 42 as input data for the second control facility 2, as indicated in step 420.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An automation system comprising:
a first control facility including a first fieldbus connection;
a second control facility including a second fieldbus connection;
a fieldbus;
a peripheral board including at least one input/output (I/O) peripheral module for connection of at least one of sensors and actuators, the peripheral board additionally including an interface module having a third fieldbus connection for communication to or from the first and second control facilities;
wherein the interface module including at least one I/O module which stores interconnection information featuring an assignment of inputs/outputs of the at least one I/O peripheral module to the control facilities;

wherein the interface module additionally includes a virtual I/O module, in which an output region, in which the first control facility can write output data, is assigned to the first control facility, and furthermore an input region, from which the second control facility can retrieve input data, is assigned to the second controller, the virtual I/O module being configured such that the output data is copied from the output region of the first control facility into the input region as input data for the second control facility.

2. A method for operating an automation system, a first control facility and a second control facility exchanging data with a peripheral board via a fieldbus, said data exchange relating to transmittal of output data to the peripheral module, the output data being delivered to an input/output (I/O) peripheral module via an I/O module in an interface module of the peripheral board, and said data exchange relating to a reception of input data by the peripheral module, and the input data being accepted by the I/O peripheral module via the I/O module in the interface module of the peripheral board, the method comprising:

operating a virtual I/O module in the interface module, in which an output region, in which the first control facility can write output data, is assigned to the first control facility, and furthermore an input region, from which the second controller can retrieve input data, is assigned to the second control facility; and copying within the virtual I/O module the output data from the output region of the first control facility into the input region as input data for the second control facility.

3. The method as claimed in claim 2, wherein a first channel is formed for the first control facility by an assignment of the output region to the first control facility and a second channel is formed for the second control facility by an assignment of the input region to the second control facility; and wherein the first control facility communicates with the second control facility via the peripheral module using a data transmission link which features the first channel and the second channel.

* * * * *